(12) United States Patent
Kitaura et al.

(10) Patent No.: US 6,610,380 B2
(45) Date of Patent: *Aug. 26, 2003

(54) OPTICAL INFORMATION RECORDING MEDIUM, MANUFACTURING METHOD, RECORDING AND REPRODUCTION METHOD, AND RECORDING/ REPRODUCTION DEVICE

(75) Inventors: Hideki Kitaura, Kyoto (JP); Noboru Yamada, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 73 days.

This patent is subject to a terminal disclaimer.

(21) Appl. No.: 09/923,190

(22) Filed: Aug. 6, 2001

(65) Prior Publication Data

US 2002/0022105 A1 Feb. 21, 2002

(30) Foreign Application Priority Data

Aug. 17, 2000 (JP) ........................................ 2000-247324

(51) Int. Cl.$^7$ ................................................. B32B 3/02
(52) U.S. Cl. ................. 428/64.1; 428/64.5; 430/270.13
(58) Field of Search ................................ 428/64.1, 64.4, 428/64.5, 64.6, 913; 430/270.13, 495.1, 945; 369/283, 288

(56) References Cited

U.S. PATENT DOCUMENTS

| | | | |
|---|---|---|---|
| 3,971,874 A | 7/1976 | Ohta et al. | |
| 4,587,209 A | 5/1986 | Ohno et al. | |
| 4,624,914 A | 11/1986 | Kimura et al. | |
| 5,764,619 A | 6/1998 | Nishiuchi et al. | |
| 6,229,785 B1 | 5/2001 | Kitaura et al. | |
| 2002/0122366 A1 * | 9/2002 | Kitaura ..................... | 369/53.3 |

FOREIGN PATENT DOCUMENTS

| | | |
|---|---|---|
| EP | 0 720 159 A2 | 7/1996 |
| EP | 0 957 477 A2 | 11/1999 |
| JP | 50-46317 | 4/1975 |
| JP | 60-203490 | 10/1985 |
| JP | 61-68296 | 4/1986 |
| JP | 62-88152 | 4/1987 |
| JP | 9-212917 | 8/1997 |
| JP | 9-326135 | 12/1997 |
| JP | 10-505188 | 5/1998 |
| JP | 2000-36130 | 2/2000 |
| WO | WO 98/09823 | 3/1998 |

OTHER PUBLICATIONS

Hiroshi Kubota, "Wave Optics", Feb. 2, 1971, pp. 206–214 and its partial English translation.

* cited by examiner

*Primary Examiner*—Elizabeth Mulvaney
(74) *Attorney, Agent, or Firm*—Merchant & Gould P.C.

(57) ABSTRACT

An optical information recording medium comprises a transparent substrate on which an information layer is disposed, the information layer comprising a recording layer and a dielectric layer, and the recording layer containing Te, O and M (wherein M is one or more elements selected from Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi), wherein a content ratio of O-atom in the recording layer ranges from 25 atomic percent to 60 atomic percent, and a content ratio of M-atom therein ranges from 1 atomic percent to 35 atomic percent, and a refractive index n of the dielectric layer is not less than 1.5. Accordingly, a write-once optical information recording medium, from which excellent recording reproduction characteristics with a high C/N ratio can be obtained even for recording and reproduction of high density information using a violet laser beam, is provided as well as a manufacturing method, a recording and reproduction method and a recording/reproduction device for the same.

21 Claims, 4 Drawing Sheets

OPTICAL INFORMATION RECORDING MEDIUM, MANUFACTURING METHOD, RECORDING AND REPRODUCTION METHOD, AND RECORDING/REPRODUCTION DEVICE

FIELD OF THE INVENTION

The present invention relates to a write-once optical information recording medium in which a high-quality information signal can be recorded and reproduced by emitting a high energy beam such as a laser beam to a thin film formed on its substrate. The present invention further relates to a manufacturing method, a recording and reproduction method, and a recording/reproduction device for the same.

BACKGROUND OF THE INVENTION

A technique to record and reproduce an information signal by forming a thin film on a transparent substrate and emitting a laser beam focused as a minute spot on this thin film is well known. As an example of such a write-once recording medium used for recording and reproduction, JP50(1975)-46317A discloses a recording medium that is provided on its substrate with a material thin film mainly composed of $TeO_x$ (0<x<2), which is a mixture of Te and $TeO_2$. With the use of such a recording medium, a considerable reflectance change can be obtained by emitting an optical beam for reproduction.

This recording thin film mainly composed of $TeO_x$ can record an information signal in an amorphous state after deposition without performing an initialization process such as a laser annealing, and by modulating an intensity of a laser beam and emitting the laser beam to form crystal marks. This is an irreversible process in which a correction by overwriting or a deletion cannot be performed, so that this recording thin film has important characteristics as a write-once recording medium as well. Furthermore, the recording thin film mainly composed of $TeO_x$ has excellent environmental stability such as moisture resistance and does not require a dielectric protective layer or the like. Therefore, the recording medium usually can be used as a single-layer thin film, which is also preferable with respect to the production cost.

However, $TeO_x$ requires some time until recorded signals become saturated, that is, until a crystallization process within a recording thin film proceeds sufficiently by irradiation of a laser beam. This aspect is unsuitable as a recording medium from which a rapid response is required, for example, in case of a computer data file in which data are recorded in a disc and the data are verified after one rotation. To compensate for this disadvantage, a recording medium is disclosed in which Pd or Au is added to $TeO_x$ as a third element (JP60(1985)-203490A, JP61(1986)-68296A, JP62(1987)-88152A). Pd or Au is believed to promote the crystal growth of Te inside a TeOx thin film during irradiation of a laser beam. Thereby, crystal grains of Te and Te—Pd alloy or Te—Au alloy are produced at a high speed. As a result thereof, a high-speed crystallization recording becomes possible, and the rapid response mentioned above can be obtained. In addition, due to its high oxidation resistance, Pd or Au does not impair the moisture resistance of a $TeO_x$ thin film.

Furthermore, as basic means for increasing the amount of information to be handled by one piece of medium, there is a method for improving the areal recording density by reducing a spot diameter of a laser beam, which is achieved either by shortening a wavelength of the laser beam or by increasing a numerical aperture of an objective lens that focuses this laser beam. In addition, for the purpose of improving the recording density in the circumferential direction, a mark edge recording in which the length of a recording mark serves as information is invented and introduced. Also, for the purpose of improving the recording density in the radial direction, a land and groove recording in which grooves for guidance of a laser beam and portions between the grooves (lands) are both used for recording is invented and introduced. To increase the amount of information to be handled by one piece of medium, there are proposed a multilayer structure medium including a plurality of layers laminated for recording and reproduction of information, a method for recording and reproduction of the same (JP9(1997)-212917A, JP10(1998)-505188A, JP2000-36130B etc.), and layer recognition means as well as layer switching means for selecting one layer from such a plurality of information layers to perform recording and reproduction (JP10(1998)-505188A).

To support such high density recording, a recording medium with improvements of the composition and the film thickness of a recording material, which is made of $TeO_x$ to which Pd or Au is added as a third element, is proposed (JP9(1997)-326135A, WO 98/09823A).

However, along with a capacity increase of information in recent years, there is a demand for a further improvement of recording density, and thus, an optical system with a shorter wavelength and a higher numerical aperture (NA), particularly a recording medium applicable to high-density recording using a violet laser beam, needs to be developed.

Even if the wavelength of a laser beam used for recording and reproduction is changed, the thermal characteristics of a recording material are basically the same. However, the optical characteristics, particularly the optical constant may change greatly due to the material. Particularly in a violet wavelength region as compared to a red wavelength region, a recording material based on $TeO_x$ has a smaller reflectance change, and a signal amplitude to be obtained as well as a C/N ratio also tend to become small.

SUMMARY OF THE INVENTION

It is an object of the present invention to provide a write-once optical information recording medium, from which excellent recording reproduction characteristics with a high C/N ratio can be obtained even for recording and reproduction of high density information using a violet laser beam. Another object is to provide a manufacturing method, a recording and reproduction method, and a recording reproduction device for the same.

To achieve the above objects, an optical information recording medium of the present invention comprises a transparent substrate on which an information layer is disposed, the information layer comprising a recording layer and a dielectric layer, and the recording layer containing Te, O and M (wherein M is one or more elements selected from Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi), wherein a content ratio of O-atom in the recording layer ranges from 25 atomic percent to 60 atomic percent, and a content ratio of M-atom therein ranges from 1 atomic percent to 35 atomic percent, and a refractive index n of the dielectric layer is not less than 1.5.

Next, a first manufacturing method for an optical information recording medium of the present invention is a method for manufacturing an optical information recording medium comprising a transparent substrate on which an information layer is disposed, the information layer comprising a recording layer and a dielectric layer. The method comprises forming a recording layer containing Te, O and M (wherein M is one or more elements selected from Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi) and a dielectric layer having a refractive index n of not less than 1.5 by a gas phase thin film deposition, wherein a content ratio of O-atom in the recording layer ranges from 25 atomic percent to 60 atomic percent, a content ratio of M-atom therein ranges from 1 atomic percent to 35 atomic percent, and conducting an annealing by maintaining a temperature of 60° C. or higher for at least 5 minutes.

Next, a second manufacturing method for an optical information recording medium of the present invention is a method for manufacturing an optical information recording medium comprising a transparent substrate, an information layer disposed thereon, and a protective layer disposed further thereon. The method comprises forming the protective layer first, and forming a recording layer containing Te, O and M (wherein M is one or more elements selected from Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi) and a dielectric layer having a refractive index n of not less than 1.5 by a gas phase thin film deposition, wherein a content ratio of O-atom in said recording layer ranges from 25 atomic percent to 60 atomic percent, and a content ratio of M-atom therein ranges from 1 atomic percent to 35 atomic percent, and, before or after said transparent substrate is attached to the information layer, conducting an annealing by maintaining a temperature of 60° C. or higher for at least 5 minutes.

Next, a recording and reproduction method for an optical information recording medium of the present invention is to record or reproduce an information signal in an optical information recording medium, which comprises a transparent substrate on which an information layer is disposed, the information layer comprising a recording layer and a dielectric layer, the recording layer containing Te, O and M (wherein M is one or more elements selected from Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi), wherein a content ratio of O-atom in the recording layer ranges from 25 atomic percent to 60 atomic percent, and a content ratio of M-atom therein ranges from 1 atomic percent to 35 atomic percent, and a refractive index n of the dielectric layer is not less than 1.5. The method comprises emitting an optical beam at a wavelength of not more than 500 nm to the optical information recording medium from a side of the transparent substrate.

Next, a recording and reproduction device for an optical information recording medium of the present invention comprises optical beam generation means for emitting an optical beam at a wavelength of not more than 500 nm for recording and reproduction of an information signal, and optical beam modulation means for, when forming a mark, modulating the optical beam with a pulse waveform including pulse trains with different pulse numbers depending on a length of the mark.

According to the present invention, it is possible to provide a write-once optical information recording medium, from which excellent recording reproduction characteristics with a high C/N ratio can be obtained even for recording and reproduction of high density information using a violet laser beam, a manufacturing method, a recording and reproduction method and a recording reproduction device for the same.

DETAILED DESCRIPTION OF THE INVENTION

In the optical information recording medium of the present invention, the information layer can be used as a single layer as well as in a plurality of layers. In the case of using the information layer in a plurality of layers, it is preferable that n layers (n is an integer of 2 or more) of information layers are laminated on the transparent substrate via a separation layer respectively disposed therebetween, and that at least one of the n layers of information layers is an information layer of the present invention. As the n layers, it is practical to use two to six layers.

Furthermore, it is preferable that an optical beam with a wavelength of not more than 500 nm is emitted to the recording layer for recording and reproduction.

Furthermore, it is preferable that a thickness of the recording layer is in a range between 5 nm and 70 nm.

Furthermore, it is preferable that the dielectric layer is made of a material mainly composed of at least one element or a mixture of two or more elements selected from $TiO_2$, $ZrO_2$, Si, SiC, $Si_3N_4$ and GeN. Here, a main component means that the compound is contained in an amount not less than 80 mol %, and more preferably not less than 90 mol %.

Furthermore, it is preferable that an extinction coefficient k of the dielectric layer is in a range between 0 and 1.0. When the extinction coefficient k is small, a plurality of information layers can be laminated.

Furthermore, it is preferable that the separation layer is an ultraviolet curable resin, and that a thickness thereof is not less than 1.0 $\mu$m.

Furthermore, it is preferable to dispose a protective layer as an outermost layer in the present invention.

Next, in the recording and reproduction method for the optical information recording medium of the present invention, it is preferable that when forming a mark, the optical beam is emitted after being modulated with a pulse waveform including pulse trains with different pulse numbers depending on a length of the mark.

Furthermore, it is preferable to perform recording in the first information layer after recording in an entire recording area of the second information layer is completed.

Similarly, when there are the n layers of information layers, it is preferable that after recording is completed in the entire recording area of a last n-th information layer, recording is performed in order for a n−1 information layer facing an irradiation side of a laser beam.

Figure 1:
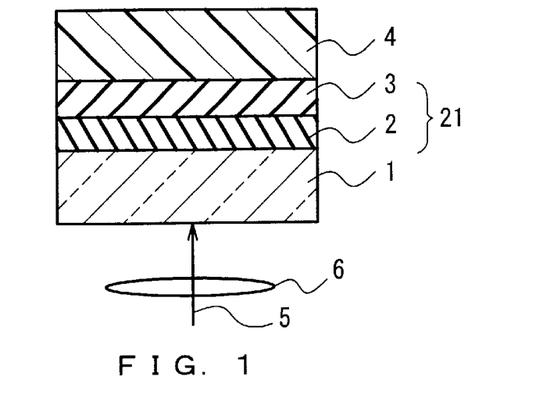
FIG. 1 is a cross-sectional view of an optical information recording medium according to one embodiment of the present invention.
Figure 2:
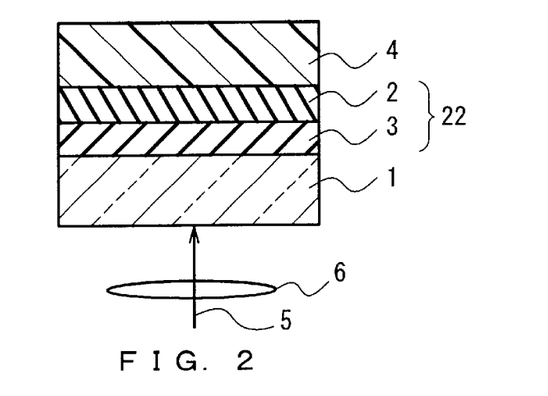
FIG. 2 is a cross-sectional view of an optical information recording medium according to another embodiment of the present invention.

In the following, embodiments of the present invention will be described specifically with reference to the drawings. FIGS. 1 and 2 are partial cross-sectional views respectively showing a configuration example of an optical information recording medium of the present invention. As shown in FIGS. 1 and 2, the optical information recording medium of the present invention comprises a transparent substrate 1 on which a dielectric layer 2, a recording layer 3 and a protective layer 4 are disposed. The dielectric layer 2 and the recording layer 3 form an information layer 21 or 22. A laser beam 5, which is focused by an objective lens 6 from the side of the transparent substrate 1, is emitted to this optical information recording medium to perform recording and reproduction.

Figure 3:
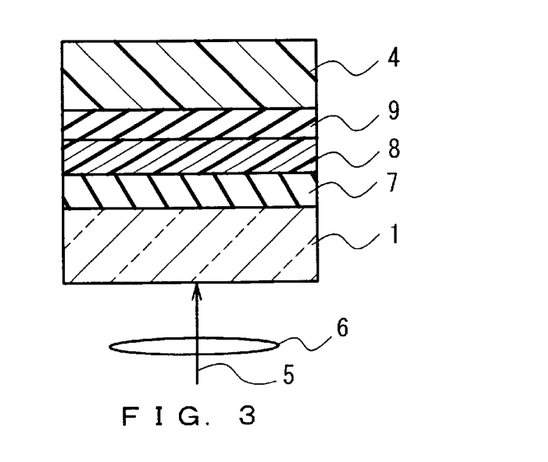
FIG. 3 is a cross-sectional view of an optical information recording medium according to yet another embodiment of the present invention.

Furthermore, FIG. 3 is a partial cross-sectional view showing a configuration example of an optical information recording medium of the present invention. As shown in FIG. 3, the optical information recording medium of the present invention comprises a transparent substrate 1 on which a first information layer 7, a separation layer 8, a second information layer 9 and a protective layer 4 are disposed. Here, at least either the first information layer 7 or the second information layer 9 comprises a dielectric layer 2 and a recording layer 3. A laser beam 5, which is focused by an objective lens 6 from the side of the transparent substrate 1, is emitted to this optical information recording medium to perform recording and reproduction.

As a material for the transparent substrate 1, it is preferable to use a material that is substantially transparent at a wavelength of the laser beam 5, for example, a polycarbonate resin, a polymethyl methacrylate resin, a polyolefin resin, a norbornene type resin, an ultraviolet curable resin, glasses, or an appropriate combination of the aforementioned materials. Moreover, a thickness of the transparent substrate 1 is not particularly limited, but a thickness of about 0.05 mm to 1.5 mm can be used.

As a material for the dielectric layer 2, a material whose refractive index n is not less than 1.5 can be used, and a refractive index of not less than 2.0 is preferable, and a refractive index of not less than 2.5 is more preferable. Specifically, a material containing, for example, ZnS, $TiO_2$, $ZrO_2$, Si, SiC, $Si_3N_4$, GeN or the like as the main component is suitable. Furthermore, a thickness of the dielectric layer 2 preferably is selected such that the thickness can enhance a reflectance change. Depending on the wavelength and the optical constant of each layer, it is preferable to determine the thickness to be in a range between $0.31 \lambda/n$ and $0.50 \lambda/n$, wherein a wavelength of an optical beam used for recording and reproduction is $\lambda$ and a refractive index of the dielectric layer 2 is n. The extinction coefficient k shows an imaginary part of a complex refractive index.

As a material for the recording layer 3, a material containing Te, O and M (wherein M is one or more elements selected from Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi) can be used. It is particularly preferable to use Pd or Au as M, since a sufficient crystallization speed and high environmental stability can be obtained.

A preferable composition range of the material for the recording layer 3 is from 25 atomic percent to 60 atomic percent for O-atom and from 1 atomic percent to 35 atomic percent for M-atom. The reason therefor will be explained below.

In an area where O-atom in the recording layer 3 is contained at less than 25 atomic percent, a thermal conductivity of the recording layer 3 is too high, so that recording marks become too large. Thus, even if the recording power is enhanced, the C/N ratio does not rise. On the other hand, in an area where O-atom in the recording layer 3 exceeds 60 atomic percent, a thermal conductivity of the recording layer 3 becomes too low, so that recording marks cannot be formed large enough even by enhancing the recording power. Thus, the C/N ratio is low, and the sensitivity also is insufficient.

In an area where M-atom in the recording layer 3 is contained at less than 1 atomic percent, the function of promoting a crystal growth of Te during irradiation of a laser beam is relatively low, and the crystallization speed in the recording layer 3 is insufficient, so that marks cannot be formed at a high speed. On the other hand, in an area where M-atom in the recording layer 3 exceeds 35 atomic percent, a reflectance change between amorphousness and crystal deteriorates, so that the C/N ratio is low.

Furthermore, with respect to the recording layer 3, an example of using a material composed of Te, O and M as the recording layer is described above, but for the purpose of adjusting a thermal conductivity and an optical constant etc. or improving a heat resistance and environmental reliability, one or more elements selected from S, N, F, B and C may be added as needed to the recording film in a composition ratio ranging to 5 atomic percent at most of the entire recording layer 3.

When a thickness of the recording layer 3 is in a range between about 5 nm and 70 nm, a sufficient C/N ratio can be obtained. When a thickness of the recording layer 3 is less than 5 nm, a reflectance and a reflectance change cannot be obtained sufficiently, so that the C/N ratio is low. Furthermore, with a thickness of more than 70 nm, the thin film in-plane thermal diffusion of the recording layer 3 is great, so that the C/N ratio drops for recording with high-density.

As a material for the protective layer 4, the same material as those described for the transparent substrate 1 can be used. However, a different material from that for the transparent substrate 1 may be used, and the material also need not be transparent at the wavelength of the laser beam 5. Moreover, a thickness of the protective layer 4 is not particularly limited, but a thickness of about 0.05 mm to 3.0 mm can be used.

As described above, at least one selected from the first information layer 7 and the second information layer 9 must be the information layer comprising the dielectric layer 2 and the recording layer 3, but the other information layer may have a different recording layer from the recording layer 3 of the present invention. It is also possible to use a rewritable type or a reproduction-only type information layer instead of a write-once type.

As the separation layer 8, an ultraviolet curable resin or the like can be used. The separation layer 8 needs to have at least a thickness of not less than a depth of focus ΔZ to be determined by a NA of the objective lens 6 and a wavelength λ of the laser beam 5 so as to reduce a crosstalk from the other when either one of the first information layer 7 or the second information layer 9 is reproduced. Here, the depth of focus ΔZ can be approximated generally to $\Delta Z = \lambda/\{2(NA)^2\}$ by taking 80% of the strength of a focusing point without aberration as a reference.

For example, in the case of λ=405 nm and NA=0.65, it will be ΔZ=0.479 μm, so that a value within ±0.5 μm is included in the depth of focus. Therefore, when this optical system is used, the thickness of the separation layer 8 preferably is set to be at least a value exceeding 1.0 μm.

Furthermore, for enabling recording and reproduction of high-density information in two information layers of the first information layer 7 and the second information layer 9, the thickness of the separation layer 8 needs to be within the tolerance of a substrate thickness including the thickness of the transparent substrate 1 that is permissible for the objective lens so that a distance between both layers is in a range in which the objective lens 6 can condense rays of light.

Furthermore, two pieces of the aforementioned optical information recording medium can be glued together with the respective sides of the protective layers 4 facing each other, thereby forming a double-sided structure. Thus, the amount of information that can be stored in one piece of medium can be doubled.

The dielectric layer 2, the recording layer 3, the first information layer 7 and the second information layer 9 can be formed, for example, by any usual gas phase thin film deposition such as vacuum evaporation, sputtering, ion plating, CVD (Chemical Vapor Deposition) and MBE (Molecular Beam Epitaxy). Here, the second information layer 9 is formed, for example, on the protective layer 4 serving as the substrate, starting from a layer that is further away from the side from which the laser beam 5 enters. On the other hand, the first information layer 7 may be formed, for example, on the transparent substrate 1, starting from a layer that is closer to the side from which the laser beam 5 enters. Alternatively, the first information layer 7 may be formed on the separation layer 8, starting from a layer that is farther away from the side from which the laser beam 5 enters.

Furthermore, the optical information recording medium of the present invention can achieve a higher C/N ratio and a lower value of jitter by maintaining it at a high temperature at least for a predetermined time as the annealing procedure. This is considered to result from the fact that a part of each atom diffused on a random basis in the recording layer 3 is glued moderately by the annealing procedure to form minute crystal nuclei, which enable a smoother crystallization for recording. Thus, marks whose mark edges are well-matched and whose shapes are well-proportioned can be formed.

The annealing temperature also differs depending on the composition of the recording layer 3, but according to the experiments conducted by the present inventors, a temperature of 60° C. or higher is preferable. In addition, the annealing temperature also needs to be lower than a softening point or a melting point of the transparent substrate 1 so that a thermal deformation or melting of the transparent substrate 1 etc. does not occur, for example, a temperature of 120° C. or higher in the case of polycarbonate. Furthermore, the annealing time also differs depending on the composition of the recording layer 3 and the annealing temperature, but according to the experiments conducted by the present inventors, it took at least 5 minutes until the effect such as an improvement of a C/N ratio becomes saturated by the annealing procedure. After saturation, no change in the recording reproduction characteristics was observed even if the annealing was maintained for several hours.

Here, the optical information recording medium of the present invention will be described with respect to the optical design and the optical characteristics. When a refractive index n of a material of each layer in a multilayer film, an extinction coefficient k and a thickness are determined, a simultaneous equation is formulated based on the energy conservation law to obtain an optical energy balance in each interface for all the interfaces, and by solving this equation, it is possible to obtain a reflectance and a transmittance with respect to an incident optical beam as well as an absorption rate of each layer for the multilayer film as a whole ("Wave Optics", Author: Hiroshi Kubota, Iwanami Shoten, 1971 etc.). By employing this method, the following optical calculations and designs were carried out.

First, optical calculations were carried out at wavelengths of 405 nm and 600 nm by changing the thickness of each layer respectively according to the following configurations arranged in order starting from the side from which the laser beam enters: configuration a formed as substrate/recording layer/substrate, configuration b formed as substrate/dielectric layer/recording layer/substrate, configuration c formed as substrate/recording layer/dielectric layer/substrate, and configuration d formed as substrate/dielectric layer/recording layer/dielectric layer/substrate.

When the calculations were carried out, an optical constant n-ik of the substrate was determined to be 1.6–i0.0 for both wavelengths. An optical constant of the dielectric layer was varied in a range of n=1.5–3.0 to examine its dependence, and it was determined to be k=0.0 for the calculations. On the assumption that Te—O—Pd (atomic ratio: Te:O:Pd=42:53:5) is used, an optical constant of the recording layer was determined to be 2.5–i0.6 (amorphous) and 2.0–i1.6 (crystal) at the wavelength of 405 nm, and 2.5–i0.6 (amorphous) and 3.0–i1.6 (crystal) at the wavelength of 660 nm. All these were obtained by measuring a reflectance and a transmittance of a sample having a film thickness of about 20 nm formed on a quartz substrate with a spectroscope and by making calculations based on values thereof. In addition, a sample in the crystal state used here was formed by crystallizing it while maintaining a temperature near the crystallization temperature of 250° C. for 2 minutes inside an oven.

The results of the optical calculations are shown in FIGS. 4A–4D. In the drawings, a reflectance of the recording layer in the crystal state is indicated as Rcry and a reflectance thereof in the amorphous state is indicated as Ramo, and a reflectance difference is indicated as αR=Rcry–Ramo. Here, the calculations were made for the recording layers with thicknesses of 20 nm and 40 nm, and the values of ΔR are calculated and shown in the drawings based on a case of optimizing the thickness of the dielectric layer such that ΔR reaches its maximum in the configurations b, c and d.

Figure 4A:
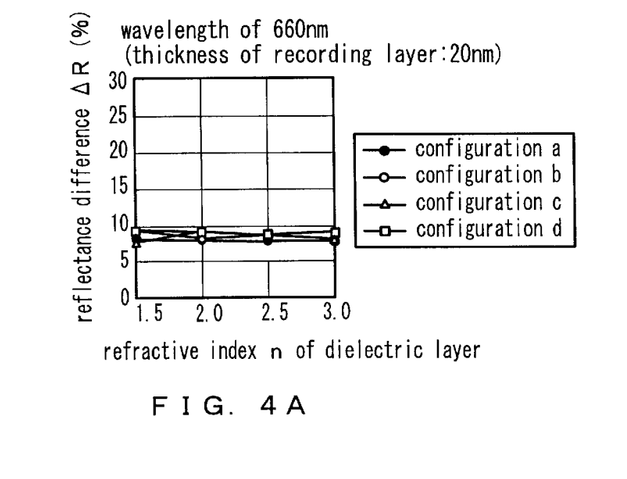
FIGS. 4A–4D are graphs showing the relationship between a reflectance difference and a refractive index n of a dielectric layer according to each wavelength/each thickness of a recording layer.
Figure 4B:
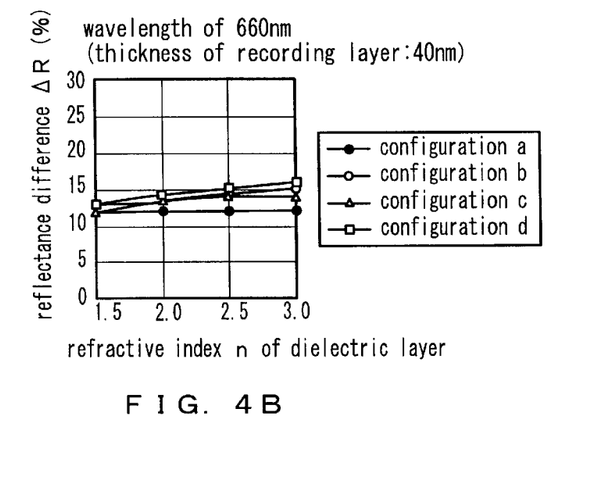
Figure 4C:
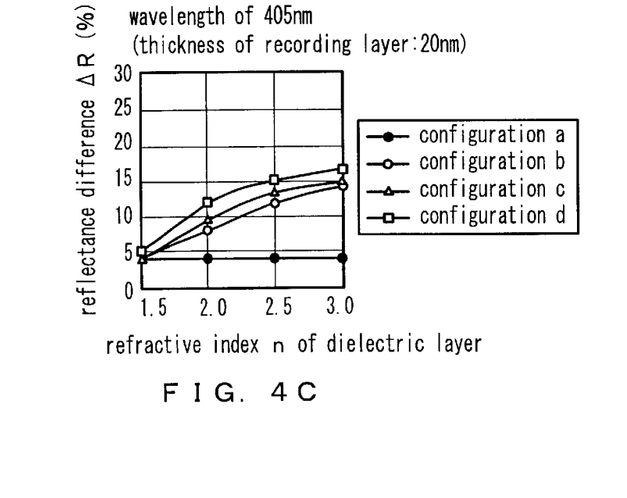
Figure 4D:
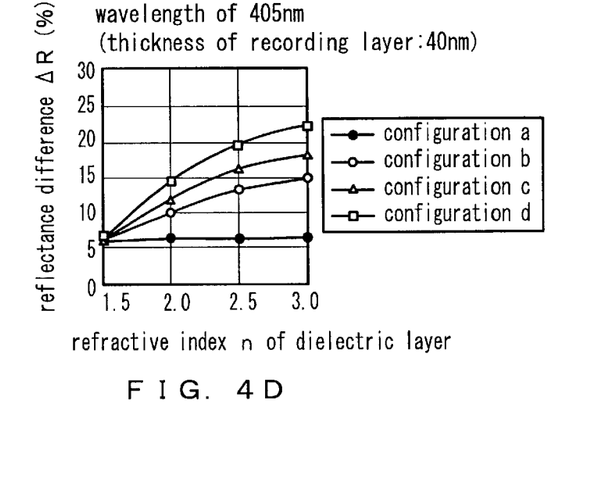

As shown in FIGS. 4A and 4B, when the wavelength is 660 nm, even if the refractive index n of the dielectric layer is raised up to 3.0, ΔR improves only about 30% at most in the configurations b, c and d in which a dielectric layer is added as compared to the configuration a that is provided only with a recording layer. On the other hand, as shown in FIGS. 4C and 4D, when the wavelength is 405 nm, ΔR is increased significantly and improved many times as the refractive index n of the dielectric layer rises in the configurations b, c and d as compared to the configuration a.

This difference in the additional effect of the dielectric layer between both the wavelengths is considered to result from a difference in the refractive index n of the crystal in the recording layer, that is, the refractive index of the crystal at the wavelength of 405 nm is reduced by about 1.0 as compared to that at the wavelength of 660 nm.

In general, an optical constant in the amorphous state has a small wavelength dependence, whereas an optical constant in the crystal state often has a large wavelength dependence. This tendency is notable for materials mainly composed of Te in which the refractive index n of the crystal state is reduced as the wavelength is shortened. In a red wavelength region, the refractive index n of the crystal state is large, so that a sufficient ΔR can be obtained without adding a dielectric layer. However, since the refractive index n of the crystal state is reduced in a violet wavelength region, ΔR becomes too small with a recording layer alone. By adding a dielectric layer with a high refractive index n, however, as large ΔR as or larger than that in a red wavelength region can be obtained.

Specifically, in case of a Te—O—M type material such as Te—O—Pd, for example, the refractive index n of the crystal state is as small as about 2.0 at a wavelength of not more than 500 nm, so that a large ΔR can be obtained by adding the dielectric layer 2 having the refractive index n of 1.5 or higher, preferably 2.0 or higher, and more preferably 2.5 or higher.

Figure 5:
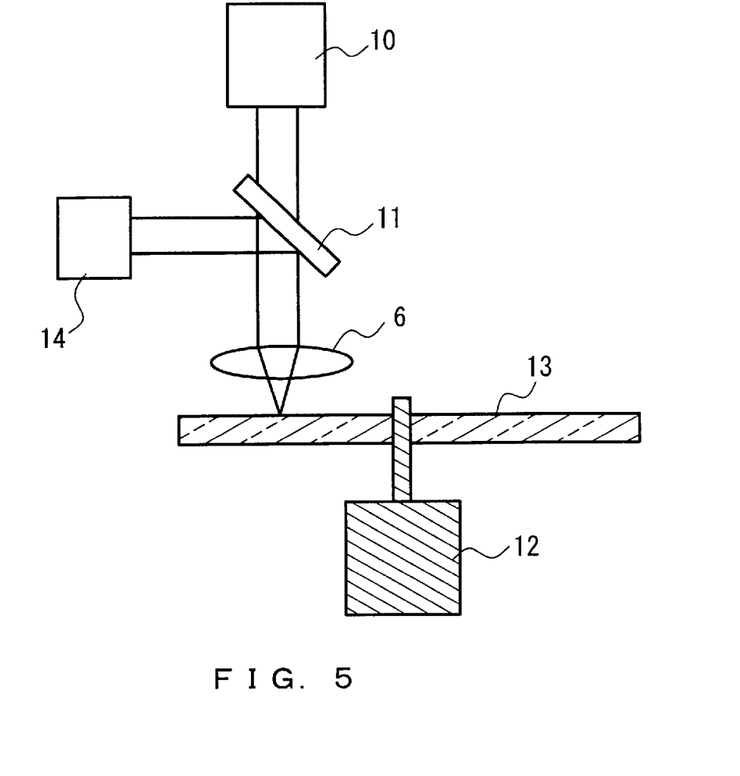
FIG. 5 is a schematic diagram showing a recording reproduction device for an optical information recording medium according to one embodiment of the present invention.

FIG. 5 is a schematic diagram showing an example of a recording and reproduction method and a recording reproduction device for an optical information recording medium of the present invention. According to FIG. 5, a laser beam 5 emitted from a laser diode 10 is focused via a half mirror 11 and an objective lens 6 on an optical disc 13 rotated by a motor 12 to record and reproduce information signals.

Figure 6:
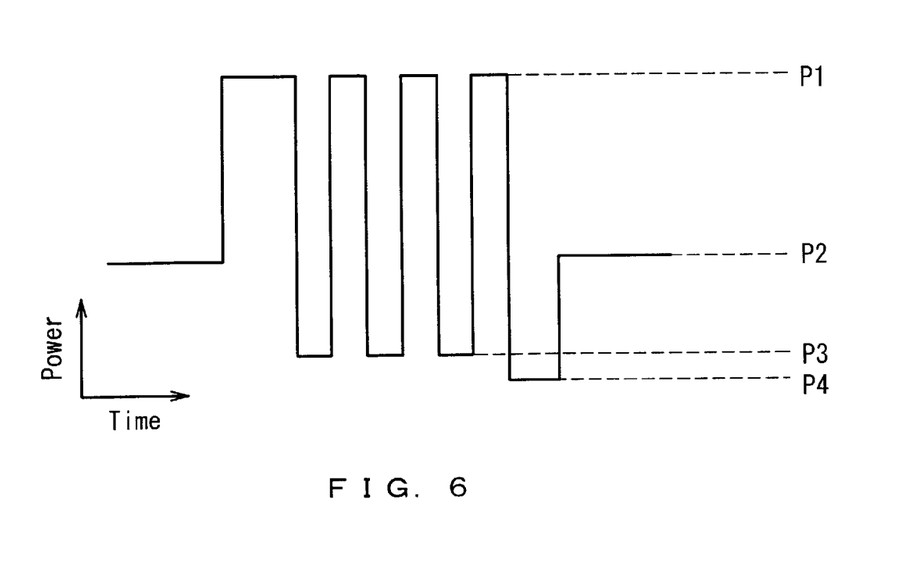
FIG. 6 is a waveform chart showing one embodiment of a pulse waveform applicable to recording in the present invention.

For recording an information signal, an intensity of the laser beam 5 is modulated by using a pulse waveform shown in FIG. 6. In other words, the intensity of the laser beam 5 is modulated at least between a power level P1, which is a power sufficient for instantaneously melting the irradiated portion by emitting a light, and power levels P2 and P3, which is a power that cannot melt the irradiated portion instantaneously even by emitting a light (wherein P1>P2≧P3≧0). In addition, in order to modulate the laser intensity as mentioned above, it is preferable to achieve this by modulating the driving current of a semiconductor laser. Alternatively, it is also possible to use means such as an electro-optical modulator, an acousto-optic modulator or the like.

For a portion where a mark is formed, a single rectangular pulse at the power level P1 may be used, but for forming an especially long mark, a recording pulse train including a plurality of pulse trains modulated between the power levels P1, P2 and P3 is used for the purpose of eliminating excess heat and forming the mark width uniformly. For a portion where a mark is not formed or erased, the power level P2 is maintained constantly.

Furthermore, when a cooling zone at a power level P4 (wherein P2>P4≧0) is provided immediately after the aforementioned plurality of pulse trains, it is effective for adjusting the shape of a mark by removing the heat in the rear end portion of the mark, which it is especially likely to be overheated. On the contrary, in the front end portion of the mark, it is also possible to broaden only the width of the first pulse among the aforementioned plurality of pulse trains to keep the width of the mark matched with the rear end or to raise this power level to higher than P1.

Furthermore, by uniformly forming each pulse and the length between pulses in the aforementioned plurality of pulse trains, the modulation can be carried out at a single frequency, so that there is an advantage in that the modulation means can be simplified.

Here, there are cases where unevenness arises in the positions of mark edges for each pattern with respect to a length of the mark, a length of a space before and after the mark, and even a length of a neighboring mark or the like, thereby causing an increase in jitter. According to the recording and reproducing method for an optical information recording medium of the present invention, for the purpose of avoiding the above problem and improving jitter, the position or the length of each pulse in the aforementioned pulse trains can be adjusted and compensated as needed such that the edge positions are matched for each pattern.

When an information signal recorded in this manner is reproduced, a continuous light at a power level of P5 (wherein P2>P5>0) is emitted to the optical disc, and the reflected light therefrom is led to enter a photodetector 14. Then, a change in this amount of reflected light is detected as the reproduction signal.

Furthermore, when information is recorded in and reproduced from the optical information recording medium provided with a plurality of information layers as shown in FIG. 3, layer recognition means and layer switching means and so forth are necessary for selecting one layer from the plurality of information layers to perform recording and reproduction. Such means is described, for example, in JP10(1998)-505188A etc. and even mounted on an already commercialized recording reproduction device of a reproduction-only type optical disc DVD. Therefore, these established techniques can be employed here.

Furthermore, according to the optical information recording medium of the present invention, when a transmittance of the recording layer 3 in the amorphous state is determined to be Tamo and a transmittance thereof in the crystal state is determined to be Tcry, Tamo>Tcry is satisfied. Therefore, when the recording layer 3 is applied to the first information layer 7, recording in the second layer preferably is performed in a state in which the first information layer 7 is not recorded yet, since the intensity of a laser beam that reaches the second information layer 9 is increased compared to the case of recording in a state in which at least a part of the first information layer 7 already is recorded. Thus, less laser power is required for recording in the second information layer 9. For this reason, it is preferable in the optical information recording medium of the present invention to start recording from the second information layer 9 until all the recordable areas in the second information layer 9 are used up, and then to start recording in the first information layer 7.

EXAMPLES

In the following, the present invention will be described more specifically with reference to the examples. However, the present invention is not limited to the following examples.

The following examples are shown in the First Example, the Second Example, and the Third Example below:
(1) First Example: one information layer, land and groove recording, a thickness of the transparent substrate 0.6 mm (NA=0.65)
(2) Second Example: two information layers, land and groove recording, a thickness of the transparent substrate 0.58 mm (NA=0.65)

(3) Third Example: four information layers, groove recording, a thickness of the transparent substrate 0.085 mm (NA=0.85)

First Example

A substrate used here was made of a polycarbonate resin and had a diameter of about 12 cm and a thickness of about 0.6 mm. The substrate was provided with a laser guide groove with a groove pitch of about 0.70 μm and a depth of about 40 nm.

On the surface of this substrate where the groove is formed, a ZnS dielectric layer with a thickness of about 60 nm was formed with the use of a ZnS target, and a Te—O—Pd recording layer with a thickness of about 40 nm was formed with the use of a Te—Pd (atomic ratio: 90:10) target, which were laminated in succession by the sputtering method. In both cases, the targets had a diameter of 100 mm and a thickness of about 6 mm, and the dielectric layer was formed at 500 W with a RF power supply with Ar alone, while the recording layer was formed at 100 W with a DC power supply with a mixed gas of Ar and $O_2$ (flow ratio: 45:55). Both films were formed in an atmosphere in which the gas pressure was maintained at about 0.2 Pa.

On top of the film surface formed in this manner, a dummy substrate was glued via an ultraviolet curable resin, which was then hardened and bonded together through irradiation of an ultraviolet light. Furthermore, this disc was annealed at 90° C. for about 2 hours to form a complete disc. This is a disc A in the present example.

According to the ultimate analysis by the Auger electron spectroscopy, the composition of the Te—O—Pd recording layer in this disc A was Te:O:Pd=42:53:5 in atomic ratio. Furthermore, an optical constant n-ik of the Te—O—Pd recording layer in the amorphous state at the wavelength of 405 nm was 2.5-i0.6 (amorphous), 2.0-i1.6 (crystal), and polycarbonate had 1.6-i0.0, and ZnS had 2.5-i0.0. According to the calculations conducted with these optical constants, a refractive index of the disc in the present example was Ramo=11.9% and Rcry=24.9%, and ΔR=13.0%.

Furthermore, as a first comparative example, a disc B was prepared in the same manner as in the present example except that the annealing procedure was omitted. As a second comparative example, a disc C was prepared in the same manner as in the present example except that the ZnS dielectric layer was excluded. A refractive index of the disc B in this comparative example was calculated as the disc A in the present example with the result of Ramo=12.7%, Rcry=18.9%, and ΔR=6.2%.

With respect to the above disc, an optical system with a wavelength of 405 nm and a numerical aperture (NA) of 0.65 was used to record a single signal of 14.6 MHz by rotating the disc at a linear velocity of 8.6 m/s. The pulse waveform used for recording was a single rectangular pulse that was modulated between a peak power P1 and a bias power P2, and the pulse width was set to be 17.5 ns. P2 was set to be 1.0 mW, and a reproduction power P5 also was set to be 1.0 mW. Under these conditions, recording was performed in an unrecorded track only once, and a C/N ratio of this signal was measured by the spectrum analyzer.

As a result thereof, with the use of the disc A in the present example, a C/N ratio of 52 dB was obtained with P1=6 mW in the groove, while a C/N ratio of 52 dB was obtained with P1=7 mW in the land. On the other hand, with the use of the disc B in the comparative example, a C/N ratio of 47 dB was obtained with P1=6 mW in the groove, while a C/N ratio of 48 dB was obtained with P1=7 mW in the land. With the use of the disc C in the comparative example, a C/N ratio of 48 dB was obtained with P1=6 mW in the groove, while a C/N ratio of 44 dB was obtained with P1=7 mW in the land.

Thus, it is clear that ΔR is increased by depositing a ZnS layer, and that it is possible to obtain an optical information recording medium with a sufficient C/N ratio for practical use by annealing.

Example 2

A substrate used here was made of a polycarbonate resin and had a diameter of about 12 cm and a thickness of about 0.58 mm. The substrate was provided with a laser guide groove with a groove pitch of about 0.70 μm and a depth of about 40 nm.

On the surface of this substrate where the groove is formed, a ZnS dielectric layer with a thickness of about 70 nm was formed as a first information layer with the use of a ZnS target, and a Te—O—Pd recording layer with a thickness of about 20 nm was formed with the use of a Te—Pd (atomic ratio: 90:10) target, which were laminated in succession by the sputtering method. Furthermore, on the surface of another identical substrate where the groove is formed, a Te—O—Pd recording layer with a thickness of about 40 nm was formed as a second information layer with the use of a Te—Pd (atomic ratio: 90:10) target, and a ZnS dielectric layer with a thickness of about 60 nm was formed with the use of a ZnS target, which were laminated in succession by the sputtering method. In all the cases, the targets had a diameter of 100 mm and a thickness of about 6 mm, and the dielectric layers were formed at 500 W with a RF power supply with Ar alone, while the recording layers were formed at 100 W with a DC power supply with a mixed gas of Ar and $O_2$ (flow ratio: 45:55). Both films were formed in an atmosphere in which the gas pressure was maintained at about 0.2 Pa.

The film surfaces formed in this manner were positioned to face to each other and bonded together via an ultraviolet curable resin disposed therebetween as a separation layer, which was then hardened and bonded together through irradiation of an ultraviolet light. In addition, this disc was annealed at 90° C. for about 2 hours to form a complete disc.

According to the same calculations conducted in the First Example, a refractive index of the disc in the present example was Ramo=3.4% and Rcry=15.1%, and ΔR=11.7% with the first information layer alone, whereas a refractive index was Ramo=11.9% and Rcry=24.9%, and ΔR=13.0% with the second information layer alone.

With respect to the above disc, an optical system with a wavelength of 405 nm and a NA of 0.65 was used to record a single signal of 14.6 MHz by rotating the disc at a linear velocity of 8.6 m/s. The pulse waveform used for recording was a single rectangular pulse that was modulated between a peak power P1 and a bias power P2, and the pulse width was set to be 17.5 ns. P2 was set to be 1.0 mW, and a reproduction power P5 was set to be 1.0 mW for reproduction of the first information layer and 1.5 mW for reproduction of the second information layer. Under these conditions, recording was performed in an unrecorded track only once, and a C/N ratio of this signal was measured by the spectrum analyzer.

As a result thereof, with the use of the disc in the present example, a C/N ratio of 49 dB was obtained with P1=7 mW in the groove and with P1=8 mW in the land of the first information layer, while a C/N ratio of 50 dB was obtained with P1=10 mW in the groove and with P1=12 mW in the land of the second information layer. In all the cases, it is clear that the optical information recording medium has a sufficient C/N ratio and sensitivity for practical use.

Example 3

Figure 7:
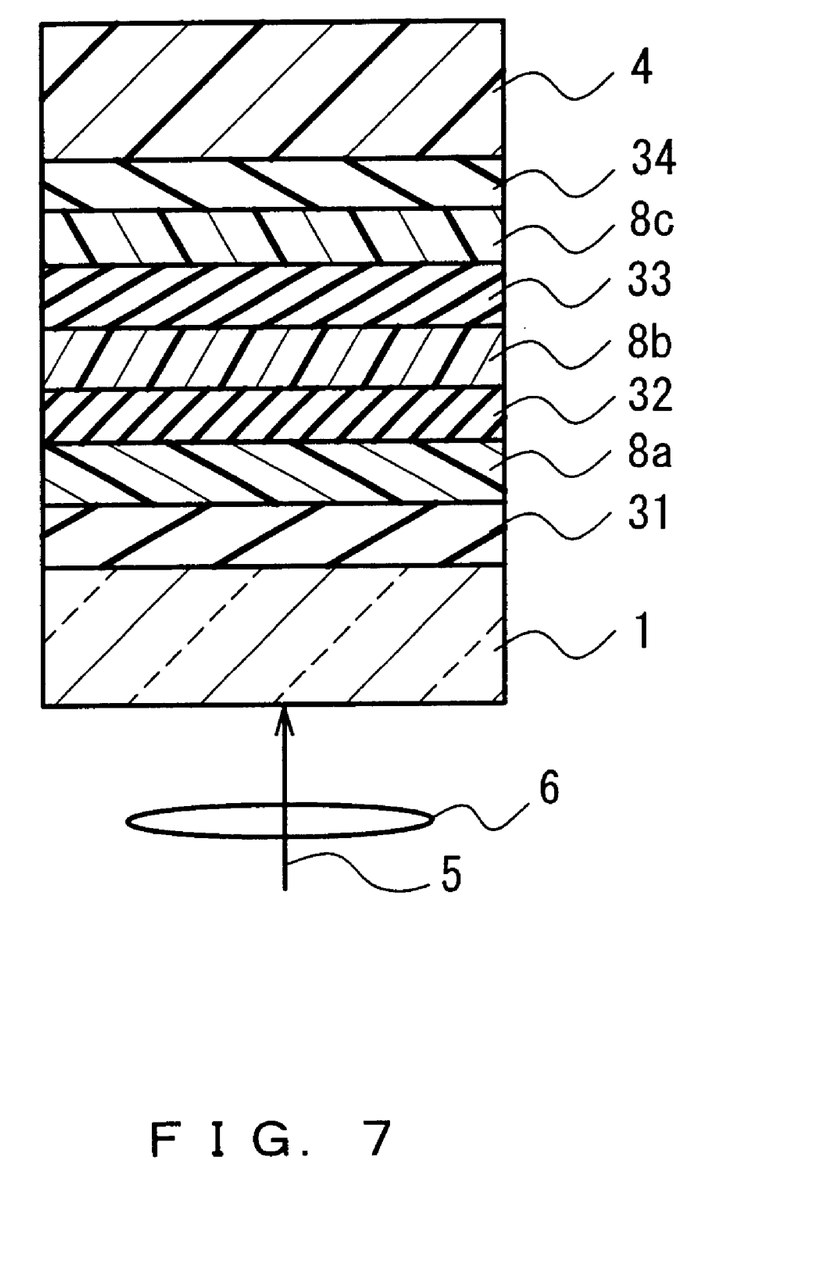
FIG. 7 is a cross-sectional view of an optical information recording medium according to Example 3 of the present invention.

FIG. 7 is a cross-sectional view of an optical information recording medium according to Example 3 of the present invention.

As a protective layer 4, a substrate used here was made of a polycarbonate resin and had a diameter of about 12 cm and a thickness of about 1.1 mm. The substrate was provided with a laser guide groove with a groove pitch of about 0.32 μm and a depth of about 30 nm.

On the surface of this protective layer 4 where the groove is formed, a Te—O—Pd recording layer with a thickness of about 40 nm was formed as a fourth information layer 34 with the use of a Te—Pd (atomic ratio: 90:10) target, and a ZnS dielectric layer with a thickness of about 60 nm was formed with the use of a ZnS target, which were laminated in succession by the sputtering method. On the surface of this fourth information layer 34, the same groove pattern as that of the protective layer was transcribed by the 2P method (photo-polymerization method) using a ultraviolet curable resin, thereby forming a separation layer 8c with a thickness of about 10 μm. On the surface of this separation layer 8c, a Te—O—Pd recording layer with a thickness of about 20 nm was formed as a third information layer 33 with the use of a Te—Pd (atomic ratio: 90:10) target, and a ZnS dielectric layer with a thickness of about 65 nm was formed with the use of a ZnS target, which were laminated in succession by the sputtering method. On the surface of this third information layer 33, the same groove pattern as that of the protective layer was transcribed by the 2P method using a ultraviolet curable resin, thereby forming a separation layer 8b with a thickness of about 10 μm. On the surface of this separation layer 8b, a Te—O—Pd recording layer with a thickness of about 20 nm was formed as a second information layer 32 with the use of a Te—Pd (atomic ratio: 90:10) target, and a ZnS dielectric layer with a thickness of about 70 nm was formed with the use of a ZnS target, which were laminated in succession by the sputtering method. On the surface of this second information layer 32, the same groove pattern as that of the protective layer was transcribed by the 2P method using a ultraviolet curable resin, thereby forming a separation layer 8a with a thickness of about 10 μm. On the surface of this separation layer 8a, a Te—O—Pd recording layer with a thickness of about 15 nm was formed as a first information layer 31 with the use of a Te—Pd (atomic ratio: 90:10) target, and a ZnS dielectric layer with a thickness of about 70 nm was formed with the use of a ZnS target, which were laminated in succession by the sputtering method. On the surface of this first information layer 31, a polycarbonate sheet was glued by using an ultraviolet curable resin to form a transparent substrate 1 with a thickness of 0.085 mm (NA=0.85). In all the cases, the films were formed by using targets having a diameter of 100 mm and a thickness of about 6 mm, and the dielectric layers were formed at 500 W with a RF power supply with Ar alone, while the recording layers were formed at 100 W with a DC power supply with a mixed gas of Ar and $O_2$ (flow ratio: 45:55). All the films were formed in an atmosphere in which the gas pressure was maintained at about 0.2 Pa.

In addition, this disc was annealed at 90° C. for about 2 hours to form a complete disc.

With respect to the groove of the above disc, an optical system with a wavelength of 405 nm and a NA of 0.85 was used to record a single signal of 14.6 MHz by emitting a laser beam 5 focused via an objective lens 6 and rotating the above disc at a linear velocity of 4.5 m/s. The pulse waveform used for recording was a single rectangular pulse that was modulated between a peak power P1 and a bias power P2, and the pulse width was set to be 17.5 ns. P2 was set to be 0.5 mW, and a reproduction power P5 was set to be 0.5 mW for reproduction of the first information layer, 0.6 mW for reproduction of the second information layer, 0.8 mW for reproduction of the third information layer, and 1.1 mW for reproduction of the fourth information layer. Under these conditions, recording was performed in an unrecorded track only once, and a C/N ratio of this signal was measured by the spectrum analyzer.

As a result thereof, with the use of the disc in the present example, a C/N ratio of 49 dB was obtained with P1=7.0 mW in the first information layer, a C/N ratio of 49 dB with P1=8.5 mW in the second information layer, a C/N ratio of 49 dB with P=10.5 mW in the third information layer, and a C/N ratio of 48 dB with P1=13.0 mW in the fourth information layer. In all the cases, it is clear that the optical information recording medium has a sufficient C/N ratio and sensitivity for practical use.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical information recording medium, comprising a transparent substrate on which an information layer is disposed, said information layer comprising a recording layer and a dielectric layer, and said recording layer containing Te, O and M (wherein M is one or more elements selected from Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi), wherein a content ratio of O-atom in said recording layer ranges from 25 atomic percent to 60 atomic percent, and a content ratio of M-atom therein ranges from 1 atomic percent to 35 atomic percent, and a refractive index n of said dielectric layer is not less than 1.5.

2. The optical information recording medium according to claim 1, wherein n layers (n is an integer of 2 or more) of information layers are laminated on said transparent substrate via a separation layer respectively disposed therebetween, and at least one of said n layers of information layers is an information layer of claim 1.

3. The optical information recording medium according to claim 1, wherein an optical beam with a wavelength of not more than 500 nm is emitted to said recording layer for recording and reproduction.

4. The optical information recording medium according to claim 1, wherein a thickness of said recording layer is in a range between 5 nm and 70 nm.

5. The optical information recording medium according to claim 1, wherein said dielectric layer is made of a material mainly composed of at least one element or a mixture of two or more elements selected from $TiO_2$, $ZrO_2$, Si, SiC, $Si_3N_4$ and GeN.

6. The optical information recording medium according to claim 1, wherein an extinction coefficient k of said dielectric layer is in a range between 0 and 1.0.

7. The optical information recording medium according to claim 2, wherein said separation layer is an ultraviolet curable resin.

8. The optical information recording medium according to claim 2, wherein a thickness of said separation layer is not less than 1.0 μm.

9. The optical information recording medium according to claim 1, further comprising a protective layer as an outermost layer.

10. The optical information recording medium according to claim 9, wherein said transparent substrate is formed on said information layer after said information layer is formed on said protective layer.

11. The optical information recording medium according to claim 1, wherein said optical information recording medium is annealed by maintaining a temperature of 60° C. or higher for at least 5 minutes.

12. A manufacturing method for an optical information recording medium comprising a transparent substrate on which an information layer is disposed, said information layer comprising a recording layer and a dielectric layer, the method comprising forming a recording layer containing Te, O and M (wherein M is one or more elements selected from Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi) and a dielectric layer having a refractive index n of not less than 1.5 by a gas phase thin film deposition, wherein a content ratio of O-atom in said recording layer ranges from 25 atomic percent to 60 atomic percent, a content ratio of M-atom therein ranges from 1 atomic percent to 35 atomic percent, and conducting an annealing by maintaining a temperature of 60° C or higher for at least 5 minutes.

13. The method for manufacturing an optical information recording medium according to claim 12, wherein n layers (n is an integer of 2 or more) of information layers are laminated on said transparent substrate via a separation layer respectively disposed therebetween, and at least one of said n layers of information layers is a recording layer of claim 12.

14. A manufacturing method for an optical information recording medium comprising a transparent substrate, an information layer disposed thereon, and a protective layer disposed further thereon, the method comprising forming the protective layer first, and forming a recording layer containing Te, O and M (wherein M is one or more elements selected from Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi) and a dielectric layer having a refractive index n of not less than 1.5 by the gas phase thin film deposition, wherein a content ratio of O-atom in said recording layer ranges from 25 atomic percent to 60 atomic percent, and a content ratio of M-atom therein ranges from 1 atomic percent to 35 atomic percent, and, before or after said transparent substrate is attached to said information layer, conducting an annealing by maintaining a temperature of 60° C. or higher for at least 5 minutes.

15. The method for manufacturing an optical information recording medium according to claim 14, wherein n layers (n is an integer of 2 or more) of information layers are laminated on said transparent substrate via a separation layer respectively disposed therebetween, and at least one of said n layers of information layers is a recording layer of claim 11.

16. A recording and reproduction method for an optical information recording medium comprising a transparent substrate on which an information layer is disposed, said information layer comprising a recording layer and a dielectric layer, said recording layer containing Te, O and M (wherein M is one or more elements selected from Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi), wherein a content ratio of O-atom in the recording layer ranges from 25 atomic percent to 60 atomic percent, and a content ratio of M-atom therein ranges from 1 atomic percent to 35 atomic percent, and a refractive index n of the dielectric layer is not less than 1.5, the method comprising recording or reproducing an information signal by emitting an optical beam at a wavelength of not more than 500 nm to said optical information recording medium from said a side of said transparent substrate.

17. The recording and reproduction method for an optical information recording medium according to claim 16, wherein n layers (n is an integer of 2 or more) of information layers are laminated on said transparent substrate via a separation layer respectively disposed therebetween, and at least one of said n layers of information layers is a recording layer of claim 16.

18. The recording and reproduction method for an optical information recording medium according to claim 16, wherein when forming a mark, said optical beam is emitted after modulated with a pulse waveform including pulse trains with different pulse numbers depending on a length of said mark.

19. The recording and reproduction method for an optical information recording medium according to claim 17, wherein after recording is completed in the entire recording area of a last n-th information layer among said n layers of information layers, recording is performed in order for a n−1 information layer facing an irradiation side of a laser beam.

20. A recording and reproduction system, comprising:

an optical information recording medium, comprising a transparent substrate on which an information layer is disposed, said information layer comprising a recording layer and a dielectric layer, said recording layer containing Te, O and M (wherein M is one or more elements selected from Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi), wherein a content ratio of O-atom in the recording layer ranges from 25 atomic percent to 60 atomic percent, and a content ratio of M-atom therein ranges from 1 atomic percent to 35 atomic percent, and a refractive index n of the dielectric layer is not less than 1.5; and a recording and reproduction device comprising optical beam generation means for emitting an optical beam at a wavelength of not more than 500 nm for recording and reproduction of an information signal, and when forming a mark, optical beam modulation means for modulating said optical beam with a pulse waveform including pulse trains with different pulse numbers depending on a length of the mark.

21. The recording and reproduction device for an optical information recording medium according to claim 20, wherein n layers (n is an integer of 2 or more) of information layers are laminated on said transparent substrate via a separation layer respectively disposed therebetween, and at least one of said n layers of information layers is a recording layer of claim 20.

* * * * *